US008263523B2

(12) United States Patent
Kibby et al.

(10) Patent No.: US 8,263,523 B2
(45) Date of Patent: *Sep. 11, 2012

(54) PREPARATION OF COBALT-RUTHENIUM/ZEOLITE FISCHER-TROPSCH CATALYSTS

(75) Inventors: Charles L. Kibby, Benecia, CA (US); Alfred Haas, Baden (DE)

(73) Assignee: Chevron U.S.A. Inc., San Ramon, CA (US)

(*) Notice: Subject to any disclaimer, the term of this patent is extended or adjusted under 35 U.S.C. 154(b) by 324 days.

This patent is subject to a terminal disclaimer.

(21) Appl. No.: 12/649,135

(22) Filed: Dec. 29, 2009

(65) Prior Publication Data

US 2010/0168258 A1   Jul. 1, 2010

Related U.S. Application Data

(60) Provisional application No. 61/141,108, filed on Dec. 29, 2008.

(51) Int. Cl.
*B01J 21/00* (2006.01)
(52) U.S. Cl. ............ 502/260; 502/326; 502/66; 502/62; 502/74; 502/87; 502/240; 502/255; 502/313; 502/332; 502/349; 502/415; 502/439; 502/303; 502/302; 502/304; 518/715; 518/714; 518/700; 518/717
(58) Field of Classification Search .................. None
See application file for complete search history.

(56) References Cited

U.S. PATENT DOCUMENTS

| | | | |
|---|---|---|---|
| 4,294,725 A | 10/1981 | Fraenkel et al. |
| 4,492,774 A | 1/1985 | Kibby et al. |
| 4,556,645 A | 12/1985 | Coughlin et al. |
| 4,585,798 A | 4/1986 | Beuther et al. |
| 4,605,676 A | 8/1986 | Kobylinski et al. |
| 4,605,679 A | 8/1986 | Kobylinski et al. |
| 4,670,414 A | 6/1987 | Kobylinski et al. |
| 4,729,981 A | 3/1988 | Kobylinski et al. |
| 4,822,824 A | 4/1989 | Iglesia et al. |
| 4,913,799 A | 4/1990 | Gortsema et al. |
| 5,036,032 A | 7/1991 | Iglesia et al. |
| 5,114,563 A | 5/1992 | Lok et al. |
| 5,128,377 A | 7/1992 | Behrmann et al. |
| 5,140,050 A | 8/1992 | Mauldin et al. |
| 5,168,091 A | 12/1992 | Behrmann et al. |
| 5,198,203 A | 3/1993 | Kresge et al. |

(Continued)

FOREIGN PATENT DOCUMENTS

EP        153517 A1    9/1985

(Continued)

OTHER PUBLICATIONS

JP2005-104771, machine translation, 2005—Usui et al.*

(Continued)

*Primary Examiner* — Melvin C Mayes
*Assistant Examiner* — Smita Patel
(74) *Attorney, Agent, or Firm* — Merchant & Gould

(57) ABSTRACT

A method for forming a cobalt-containing Fischer-Tropsch catalyst involves precipitating a cobalt oxy-hydroxycarbonate species by turbulent mixing, during which a basic solution collides with an acidic solution comprising cobalt. The method further involves depositing the cobalt oxy-hydroxycarbonate species onto an acidic support to provide a catalyst comprising cobalt and the acidic support. The acidic support comprises a zeolite, a molecular sieve, or combinations thereof.

18 Claims, 10 Drawing Sheets

U.S. PATENT DOCUMENTS

| | | | |
|---|---|---|---|
| 5,246,689 A | 9/1993 | Beck et al. | |
| 5,292,705 A | 3/1994 | Mitchell | |
| 5,334,368 A | 8/1994 | Beck et al. | |
| 5,424,264 A | 6/1995 | Richard et al. | |
| 5,466,646 A | 11/1995 | Moser | |
| 5,545,674 A | 8/1996 | Behrmann et al. | |
| 5,728,918 A | 3/1998 | Nay et al. | |
| 5,733,839 A | 3/1998 | Espinoza et al. | |
| 5,756,419 A | 5/1998 | Chaumette et al. | |
| 6,191,066 B1 | 2/2001 | Singleton et al. | |
| 6,245,709 B1 | 6/2001 | Clark et al. | |
| 6,262,131 B1 | 7/2001 | Arcuri et al. | |
| 6,313,062 B1 | 11/2001 | Krylova et al. | |
| 6,331,574 B1 | 12/2001 | Lapidus et al. | |
| 6,331,575 B1 | 12/2001 | Mauldin | |
| 6,465,529 B1 | 10/2002 | Daage et al. | |
| 6,472,441 B1 | 10/2002 | Kibby | |
| 6,491,880 B1 | 12/2002 | Wang et al. | |
| 6,521,565 B1 | 2/2003 | Clavenna et al. | |
| 6,531,517 B1 | 3/2003 | Wachter et al. | |
| 6,649,662 B2 * | 11/2003 | Kibby | 518/715 |
| 6,706,661 B1 | 3/2004 | Krylova et al. | |
| 6,753,351 B2 | 6/2004 | Clark et al. | |
| 7,045,486 B2 | 5/2006 | Wang et al. | |
| 7,157,501 B2 | 1/2007 | Steenwinkel et al. | |
| 7,300,959 B2 | 11/2007 | Vogt et al. | |
| 7,361,619 B2 | 4/2008 | Malek et al. | |
| 7,384,986 B2 | 6/2008 | Huang et al. | |
| 2003/0149210 A1 | 8/2003 | Hurtevent et al. | |
| 2004/0171703 A1 * | 9/2004 | Nay et al. | 518/726 |
| 2004/0204504 A1 | 10/2004 | Malek et al. | |
| 2007/0225383 A1 | 9/2007 | Cortright et al. | |
| 2008/0255256 A1 | 10/2008 | Rytter | |
| 2008/0275145 A1 | 11/2008 | Casci et al. | |

FOREIGN PATENT DOCUMENTS

| | | |
|---|---|---|
| EP | 0609079 | 8/1994 |
| EP | 1450950 | 6/2003 |
| WO | 00/61275 | 10/2000 |
| WO | WO 03/024905 A1 * | 3/2003 |

OTHER PUBLICATIONS

U.S. Appl. No. 12/649,108, filed Dec. 29, 2009 entitled "Preparation of Cobalt-Ruthenium Fischer-Tropsch Catalysts".

U.S. Appl. No. 12/343,534, filed Dec. 24, 2008 entitled "Zeolite Supported Cobalt Hybrid Fischer-Tropsch Catalysts".

International Search Report from PCT/US2009/069742.

International Preliminary Examination Report from PCT/US2009/069742.

Beck, J.S. et al., A new family of mesoporous molecular sieves prepared with liquid crystal templates., J. Am. Chem. Soc. 114, 10834-10843 (1992).

Kresge, et al., "Ordered mesoporous molecular sieves synthesized by a liquid-crystal template mechanism" Nature 359:710-712 (1992).

\* cited by examiner

PREPARATION OF COBALT-RUTHENIUM/ZEOLITE FISCHER-TROPSCH CATALYSTS

This application claims priority to U.S. provisional application No. 61/141,108 filed Dec. 29, 2008, which is incorporated herein by reference in its entirety. This application is related to a co-pending application entitled "Preparation of Cobalt-Containing Fischer-Tropsch Catalysts" filed Dec. 29, 2009, which is incorporated herein by reference in its entirety.

FIELD OF ART

The present disclosure relates to a method for forming a cobalt-containing Fischer-Tropsch catalyst by precipitation of metal species through turbulent mixing and deposition of the precipitated species onto an acidic support. The present disclosure also relates to a method of performing a Fischer-Tropsch synthesis reaction with the cobalt-containing Fischer-Tropsch catalyst.

BACKGROUND

Generally, precipitation or impregnation methods that add compounds of metal to preformed refractory supports (such as alumina or silica) are used to prepare small-particle, cobalt Fischer-Tropsch catalysts. During commercial production of these catalysts, precipitations on a large scale require aging conditions for the precipitate-support slurry that are the same as the precipitation conditions. However, precise control of process conditions is difficult.

Accordingly, there is a need for a method for forming a cobalt-containing Fischer-Tropsch catalyst which permits precise control of process conditions. There is also a need for a method for forming a cobalt-containing and acidic support-containing Fischer-Tropsch catalyst that preserves the strong acidity of the acidic support, while providing a highly active Fischer-Tropsch component. Additionally, there is a need for a method for forming a cobalt-containing Fischer-Tropsch catalyst having good selectivity for the formation of liquid hydrocarbon products (i.e. $C_5$-$C_{20}$).

SUMMARY

Disclosed herein is a method for forming a cobalt-containing Fischer-Tropsch catalyst. This method comprises precipitating a cobalt oxy-hydroxycarbonate species by turbulent mixing, during which a basic solution collides with an acidic solution comprising cobalt. The method also comprises depositing the cobalt oxy-hydroxycarbonate species onto an acidic support. The acidic support comprises a zeolite, a molecular sieve, or combinations thereof.

Among other factors, the use of turbulent mixing to achieve precipitation can provide several advantages to the present catalyst forming method. Turbulent mixing can minimize blocking and fouling because it reduces contact of reactants with channel walls. Turbulent mixing can provide a high nucleation rate thereby generating extremely small precipitate particles. Furthermore, turbulent mixing can achieve almost instantaneous mixing. Precise control of process conditions (e.g. pH, temperature, flow rate, size of the support material, aging time, calcination conditions) is possible with turbulent mixing. Additionally, the use of turbulent mixing to precipitate a cobalt oxy-hydroxycarbonate species can provide catalysts with a highly active Fischer-Tropsch component, while preserving the strong acidity of the acidic support including a zeolite, a molecular sieve, or combinations thereof.

Also disclosed herein is a method of performing a Fischer-Tropsch synthesis reaction. The method comprises forming a cobalt-containing Fischer-Tropsch catalyst by the method described herein and contacting the cobalt-containing Fischer-Tropsch catalyst with synthesis gas.

Among other factors, using the cobalt-containing Fischer-Tropsch catalyst produced by the method described herein to produce Fischer-Tropsch hydrocarbons can provide a significant amount of liquid hydrocarbon product (i.e. $C_5$-$C_{20}$). In particular, the cobalt-containing Fischer-Tropsch catalyst produced by the method described herein can shift wax product produced by alumina-supported cobalt-containing Fischer-Tropsch catalysts (as described in the U.S. patent application entitled "Preparation of Cobalt-Containing Fischer-Tropsch Catalysts," which claims priority to U.S. provisional application No. 61/141,103 and is being filed concurrently herewith) to liquid hydrocarbon product (i.e. $C_5$-$C_{20}$). The cobalt-containing Fischer-Tropsch catalyst produced by the method described herein includes an acidic support comprising a zeolite, a molecular sieve, or combinations thereof. A zeolite, a molecular sieve, or combinations thereof is an acidic support material in contrast to a conventional support material such as alumina, silica, magnesia, titania, zirconia, ceria-zirconia, and magnesium aluminate. Furthermore, the cobalt-containing Fischer-Tropsch catalyst produced by the method described herein can produce hydrocarbon products having a similar carbon number distribution to hydrocarbon products produced by alumina-supported cobalt-containing Fischer-Tropsch catalysts, while advantageously producing very little or no alcohols.

DETAILED DESCRIPTION

A. Definitions

Figure 1:
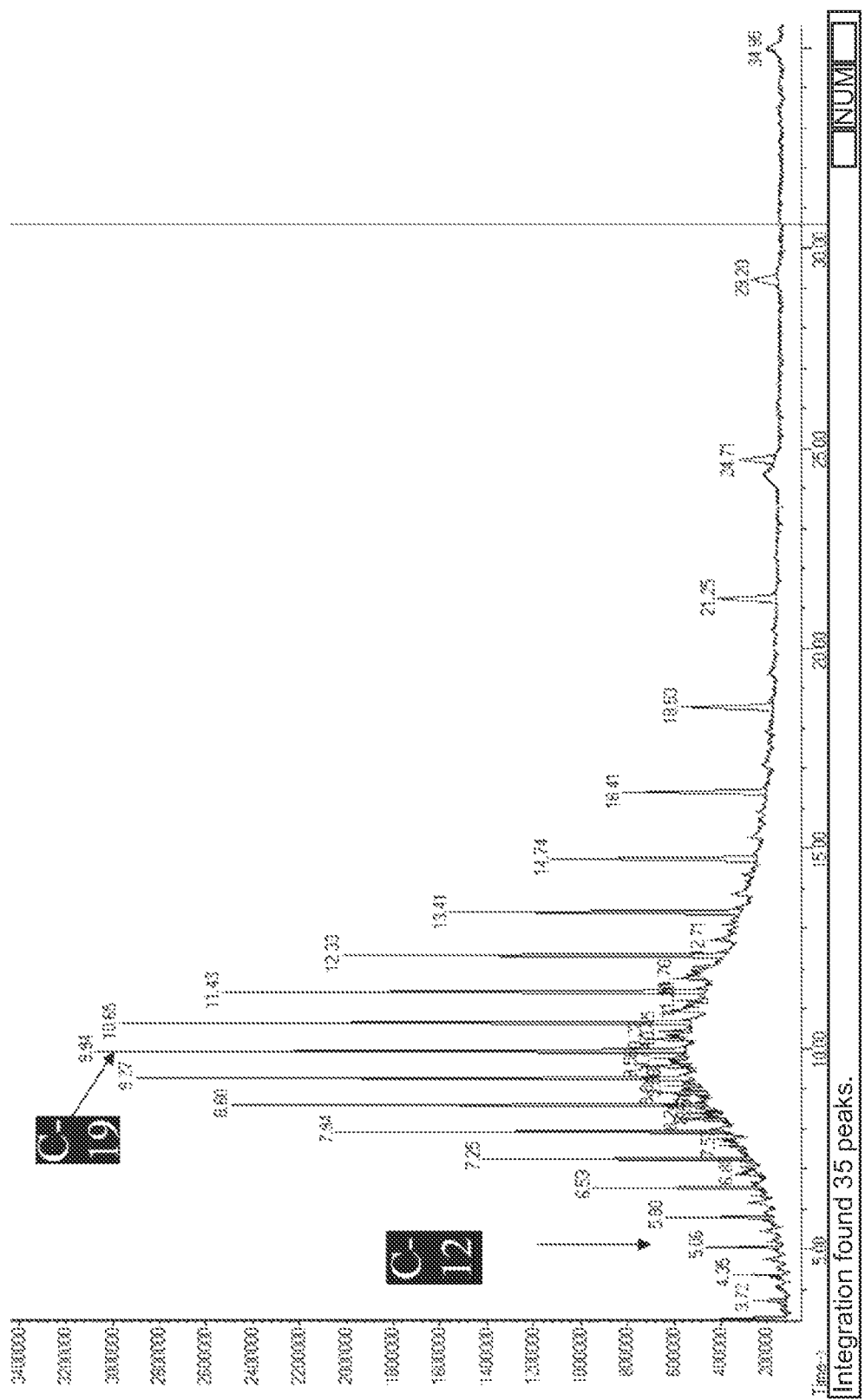
FIG. 1 is a GC-MS (gas chromatography-mass spectrometry) analysis of hydrocarbon products produced with a Co/ZSM-5 catalyst at 230° C., 10 bar, and $H_2$/CO=2.

The following terms appear throughout the specification and have the following meanings, unless otherwise indicated.

As used herein, "specific activity" refers to the rate of hydrocarbon production per unit weight of cobalt.

"Turbulent mixing" refers to mixing that uses the collision of two opposed high-speed jets of liquids to achieve ultrafast mixing. Due to the collision, a thin disk-shaped mixing zone is generated which bursts apart into very fine droplets. The droplets are transported to an exit port by an additional gaseous transport stream flowing perpendicular to the flow direction of the colliding jets.

"Volumetric activity" refers to the rate of hydrocarbon production per unit volume of catalyst.

B. Method for Forming a Cobalt-Containing Fischer-Tropsch Catalyst

I. Precipitation and Deposition

In the presently disclosed methods for forming catalysts, a basic solution and an acidic solution comprising cobalt are mixed by turbulent mixing. Such turbulent mixing precipitates a cobalt oxy-hydroxycarbonate species. Thereafter, the methods involve depositing the cobalt oxy-hydroxycarbonate species onto an acidic support to provide a catalyst comprising cobalt and the acidic support. In this manner, the presently disclosed methods can produce highly active catalysts with strong metal and acid functions. The acidic support provides an isomerization catalyst for olefins and the cobalt provides a hydrocracking catalyst for paraffins.

The acidic support comprises a zeolite, a molecular sieve, or combinations thereof. A zeolite, a molecular sieve, or combinations thereof is an acidic support material in contrast to a conventional support material such as alumina, silica, magnesia, titania, zirconia, ceria-zirconia, and magnesium aluminate. In addition to the acidic support material, the acidic support can also comprise conventional support materials such as alumina, silica, magnesia, titania, zirconia, ceria-zirconia, and magnesium aluminate. Exemplary zeolites include a beta zeolite, an ultrastable Y (USY) zeolite, ZSM-5, ZSM-11, ZSM-12, ZSM-23, ZSM-48, SSZ-13, SSZ-32, SSZ-33, SSZ-46, SSZ-53, SSZ-55, SSZ-57, SSZ-58, SSZ-59, SSZ-60, SSZ-64, SSZ-70, TON type zeolites, mordenite, ferrierite, clinoptilolite, gmelinite, or combinations thereof. The zeolite may also be a bound zeolite. For example, the zeolite can be alumina bound ZSM-5. Exemplary molecular sieves include non-zeolitic molecular sieves and mesoporous molecular sieves. Non-zeolitic molecular sieves that can be used include, but are not limited to, silicoaluminophosphates (SAPOs), ferroaluminophosphates, titanium aluminophosphate, and various ELAPO molecular sieves described in U.S. Pat. No. 4,913,799 and the references cited therein, which patent and references are incorporated herein by reference in their entirety. Details regarding the preparation of various non-zeolitic molecular sieves can be found in U.S. Pat. No. 5,114,563, U.S. Pat. No. 4,913,799, and the references cited in U.S. Pat. No. 4,913,799, which patents and references are incorporated herein by reference in their entirety. Exemplary mesoporous molecular sieves are the M41S family of materials, MEM-41, and MCM48. These exemplary mesoporous molecular sieves are described in J. Am. Chem. Soc. 1992, 114, 10834-10843; U.S. Pat. Nos. 5,246,689, 5,198,203, and 5,334,368; and Kresge et al., Nature 359 (1992) 710, which documents are incorporated herein by reference in their entirety.

The acidic support material's mole ratio of Si/Al can vary. The Si/Al mole ratio can be between about 3 and about 350, for example, between about 5 and about 300. In certain embodiments, it is preferred that the Si/Al mole ratio be relatively high and, in other embodiments, it is preferred that the Si/Al mole ratio be relatively low.

In one embodiment, the acidic support material has a relatively high Si/Al mole ratio (i.e. relatively low acidity), for example, between about 100 and about 300. This embodiment is advantageous because it can provide a cobalt-containing Fischer-Tropsch catalyst having greater activity than a catalyst having an acidic support material with a relatively low Si/Al mole ratio (i.e. relatively high acidity). This embodiment is also advantageous because it can produce a carbon number distribution similar to that produced by an alumina-supported catalyst while suppressing alcohol formation. The alumina-supported catalyst utilizes alumina, a conventional support material, and is described in a co-pending application entitled "Preparation of Cobalt-Containing Fischer-Tropsch Catalysts" filed Dec. 29, 2009.

In another embodiment, the acidic support material has a relatively low Si/Al mole ratio (i.e. relatively high acidity), for example, $\leq$ about 75 such as $\leq$ about 45. A catalyst with a similar effect with regard to carbon number distribution and alcohol suppression can also be produced by using a relatively small amount of the relatively high acidity support material. In particular, a catalyst with a similar effect can be produced by using a weight of acidic support material comparable to the weight of cobalt. For example, a catalyst with 20 wt % Co, less than 20 wt % acidic support material, and the remaining wt % of conventional support (e.g. alumina, silica, magnesia, titania) can produce a similar effect. As another example, a catalyst with 10 wt % Co, less than 10 wt % acidic support material, and the remaining wt % of conventional support can produce a similar effect.

Figure 2:
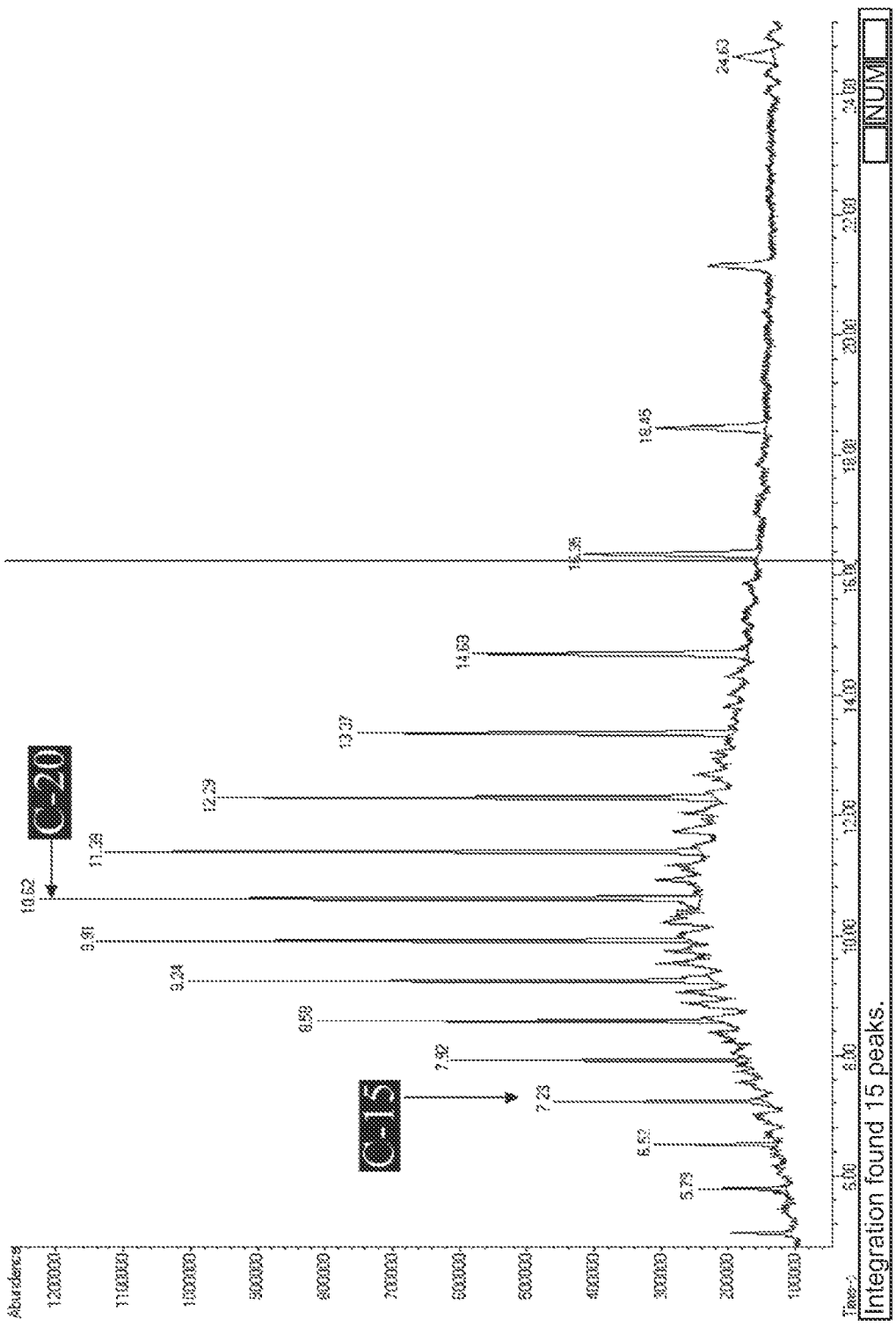
FIG. 2 is a GC-MS analysis of hydrocarbon products produced with a Co/ZSM-5 catalyst at 230° C., 10 bar, and $H_2$/CO=1.6.
Figure 3:
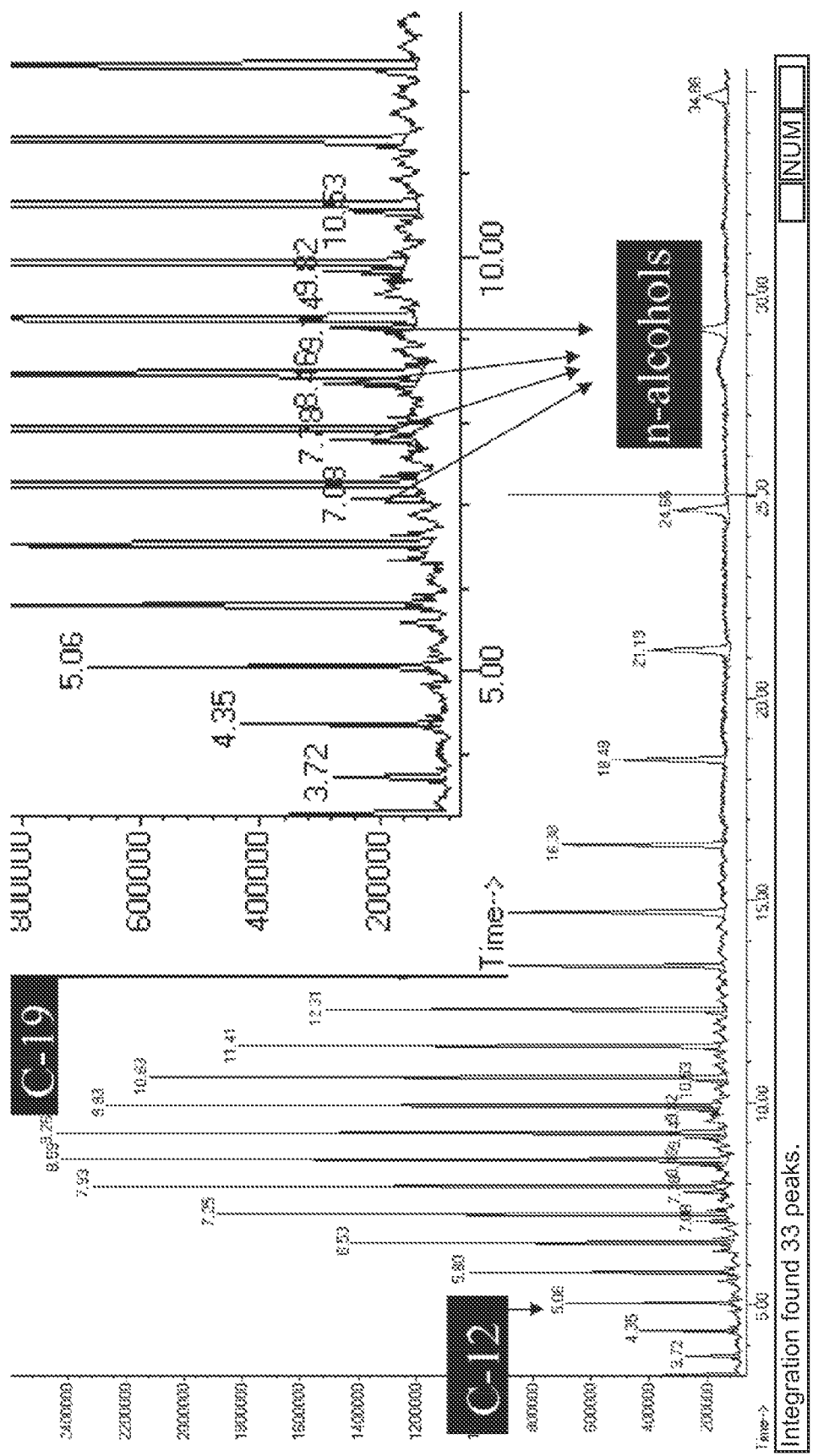
FIG. 3 is a GC-MS analysis of hydrocarbon products produced with a Co/alumina catalyst at 230° C., 10 bar, and $H_2$/CO=2.
Figure 4:
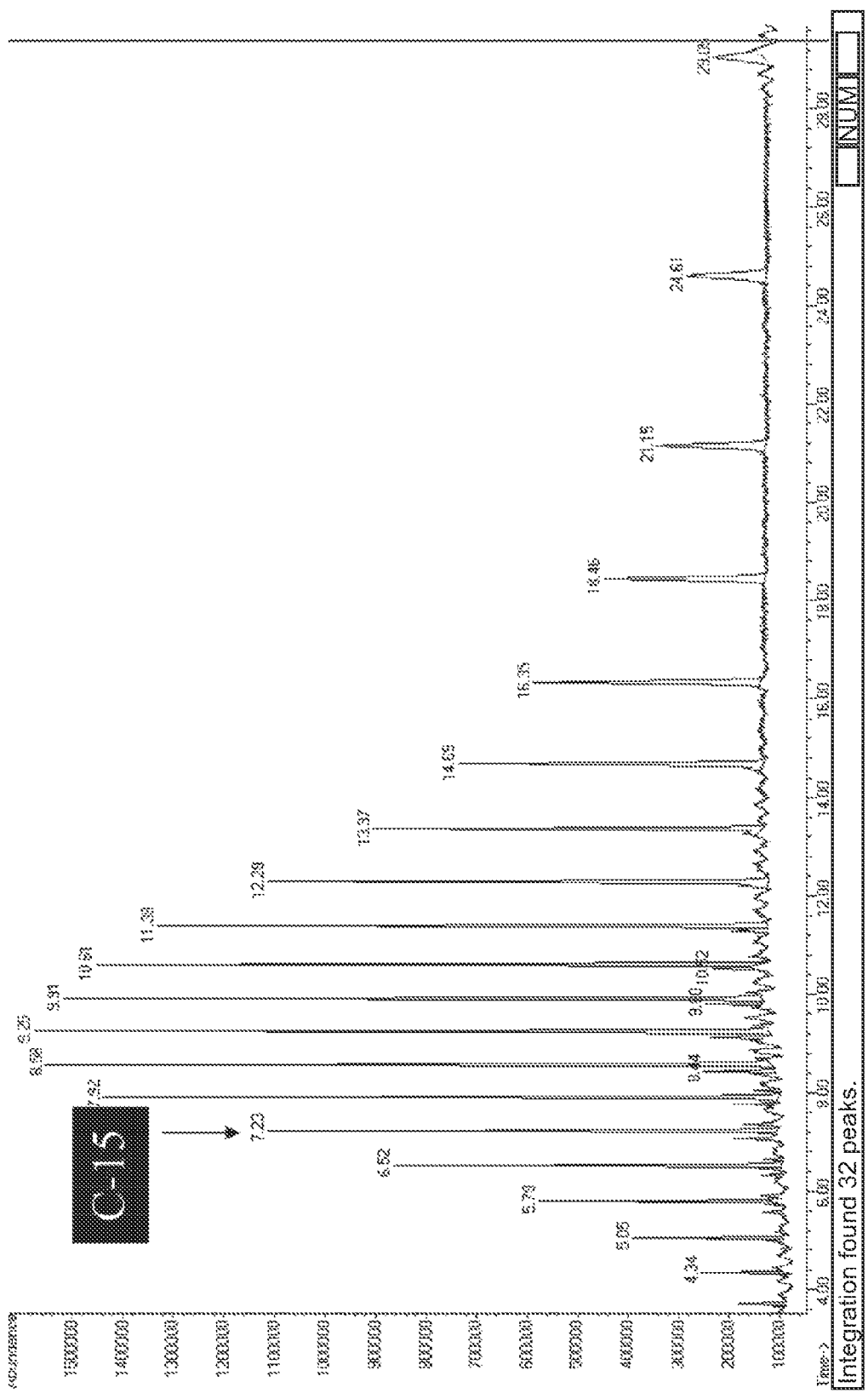
FIG. 4 is a GC-MS analysis of hydrocarbon products produced with a Co/alumina catalyst at 230° C., 10 bar, and $H_2$/CO=1.6.
Figure 5:
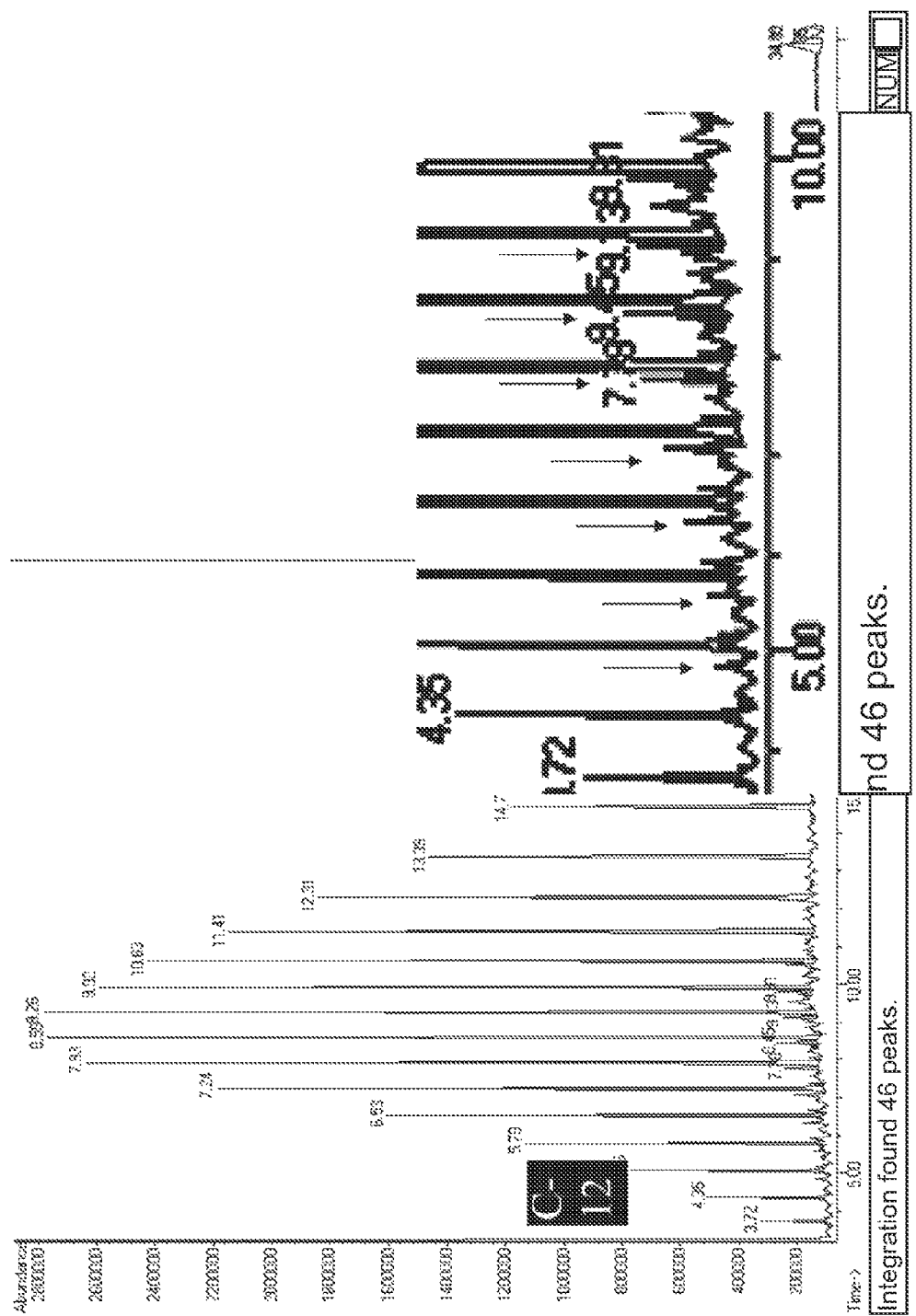
FIG. 5 is a GC-MS analysis of hydrocarbon products produced with a Co/alumina catalyst at 230° C., 10 bar, and $H_2$/CO=2.
Figure 6:
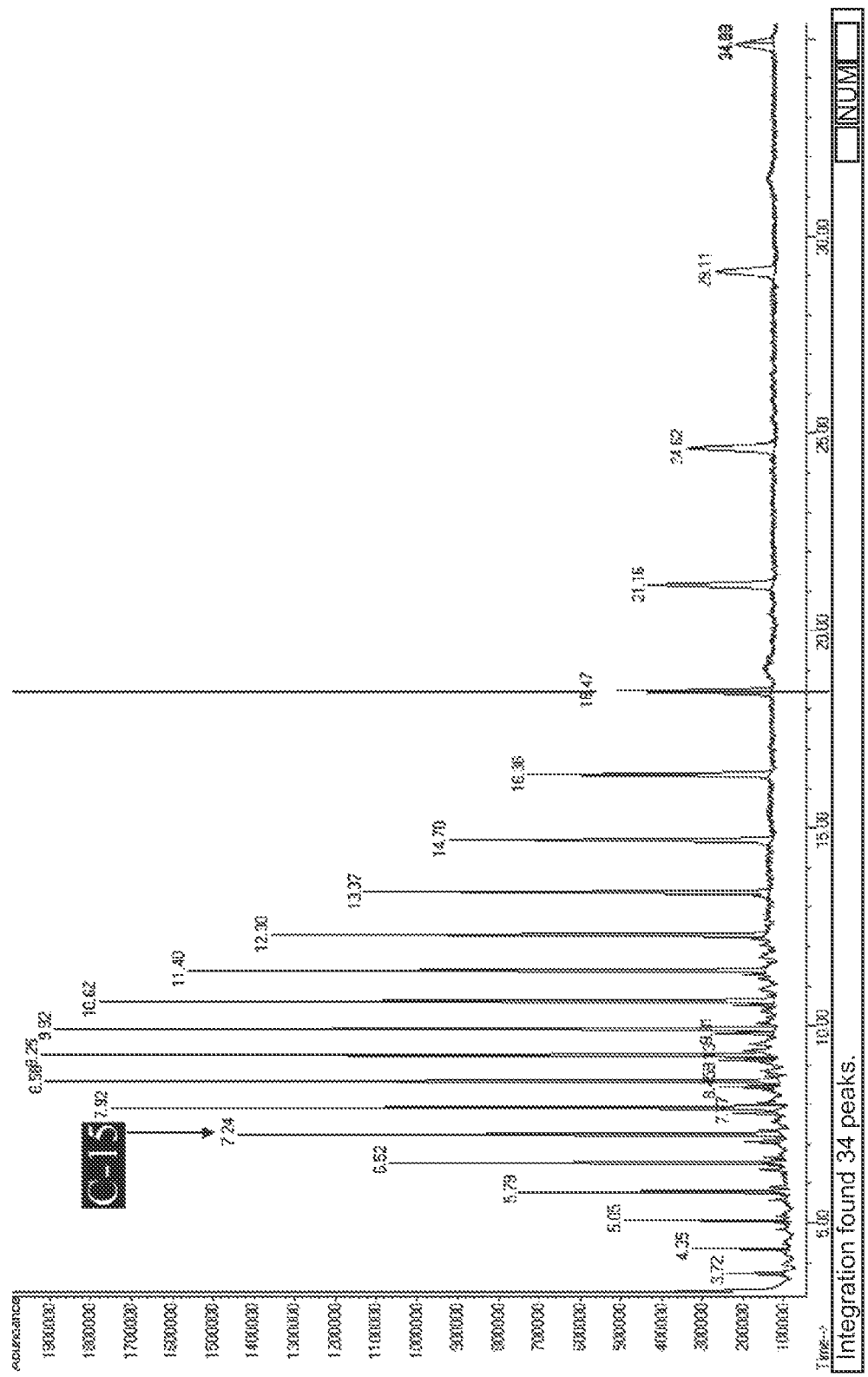
FIG. 6 is a GC-MS analysis of hydrocarbon products produced with a Co/alumina catalyst at 230° C., 10 bar, and $H_2$/CO=1.6.
Figure 7:
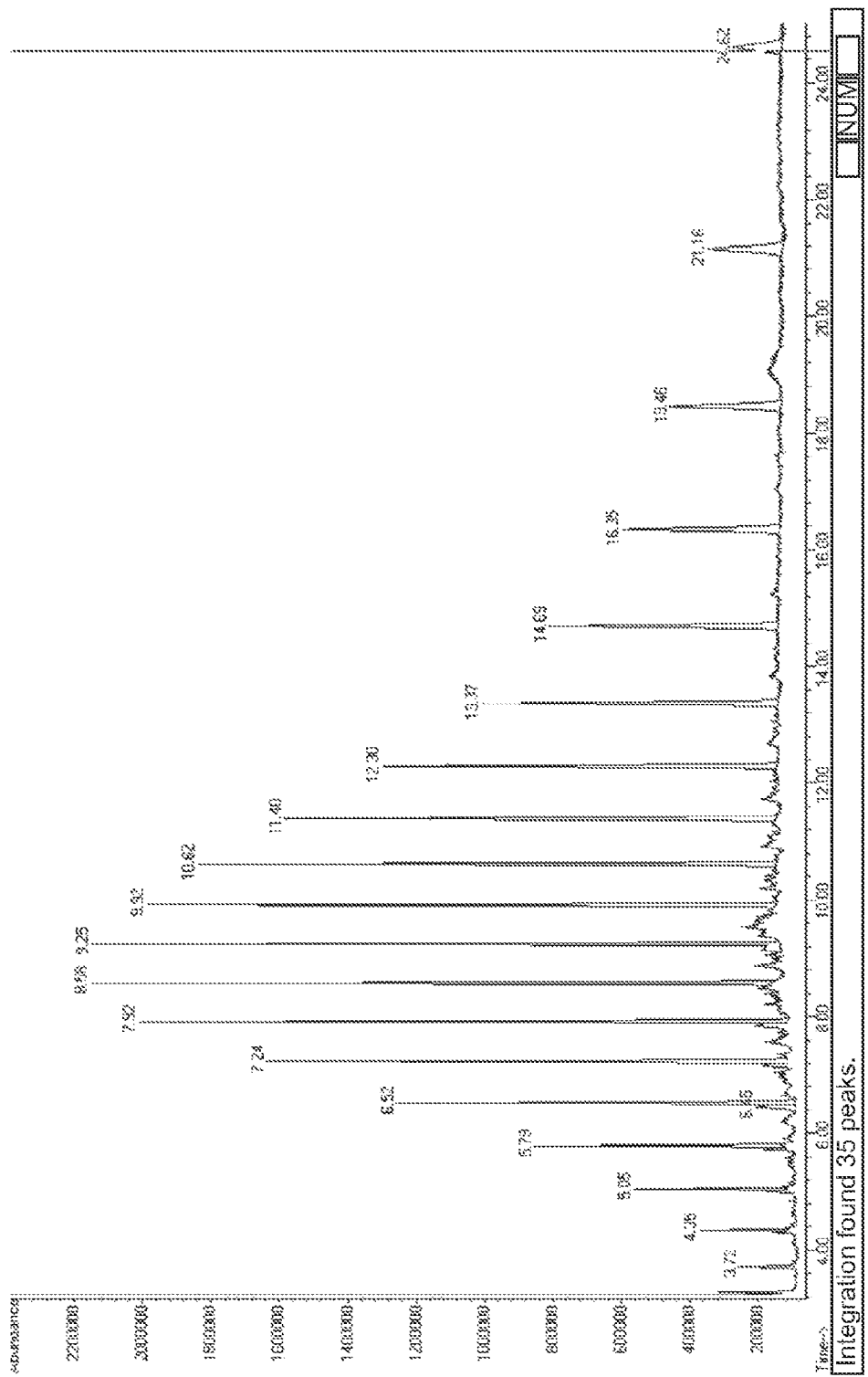
FIG. 7 is a GC-MS analysis of hydrocarbon products produced with a Co/USY (CBV-780) catalyst at 230° C., 10 bar, and $H_2$/CO=2.
Figure 8:
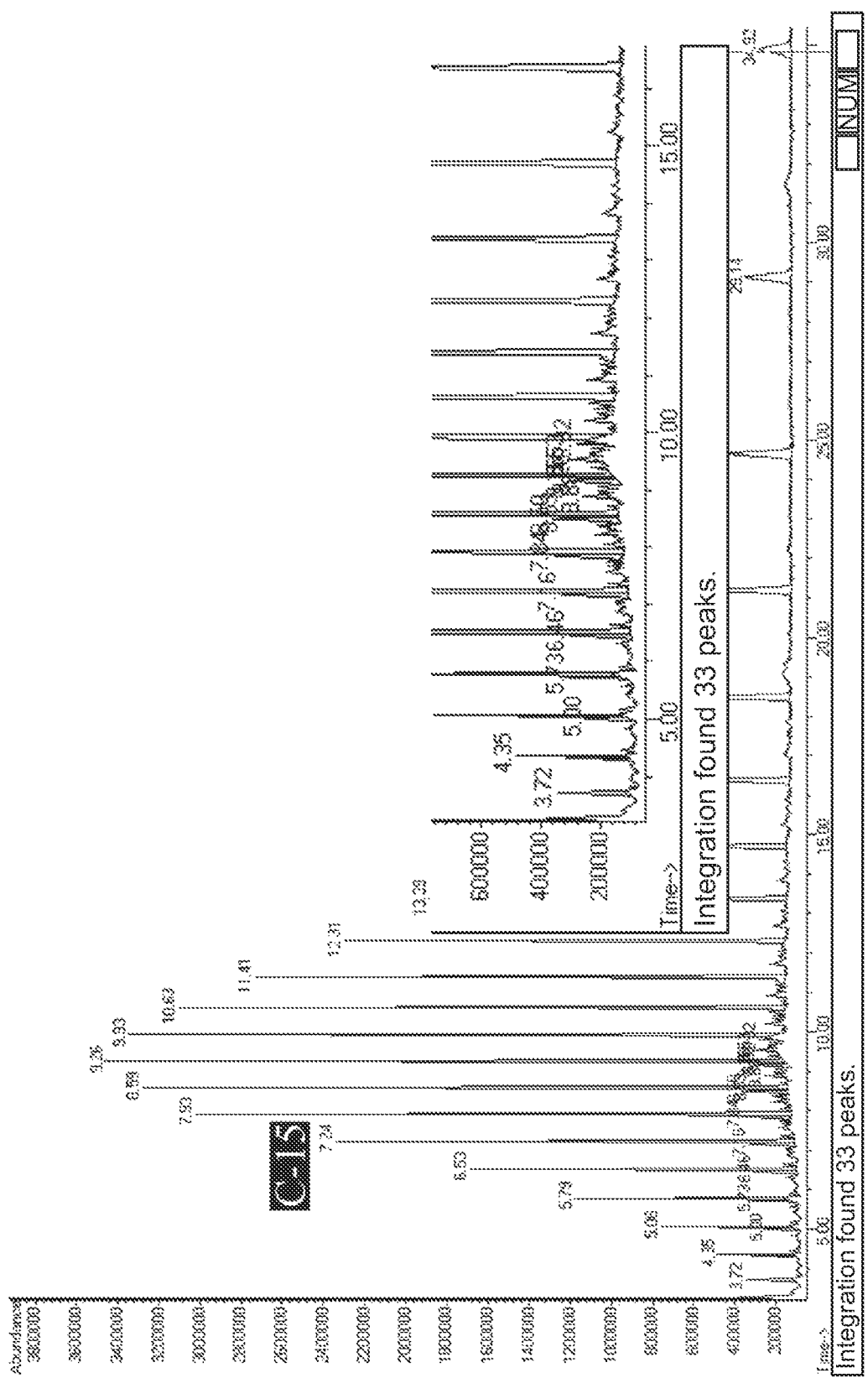
FIG. 8 is a GC-MS analysis of hydrocarbon products produced with a Co/USY-3 catalyst at 230° C., 10 bar, and $H_2$/CO=1.6.
Figure 9:
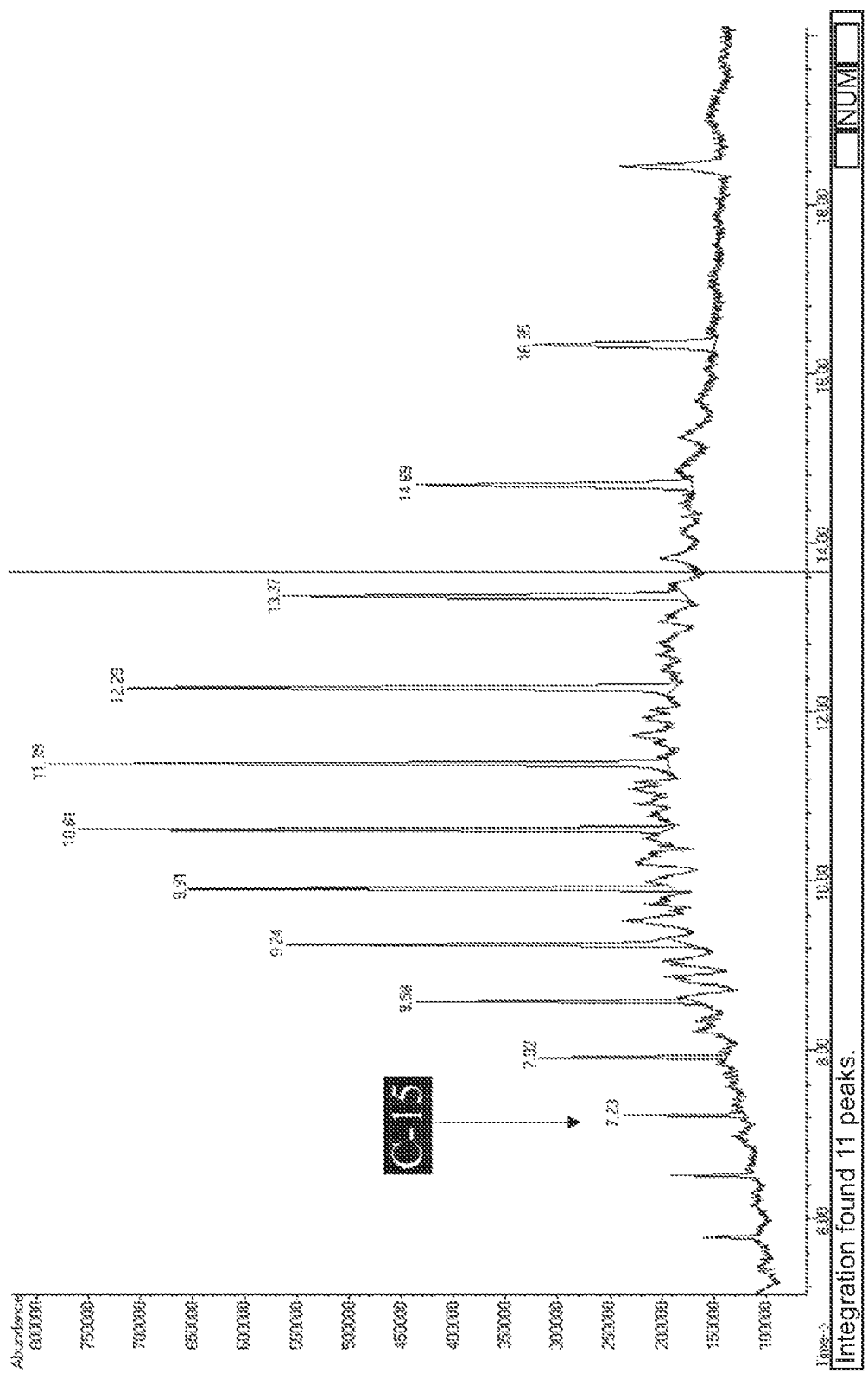
FIG. 9 is a GC-MS analysis of hydrocarbon products produced with a Co/BEA catalyst at 230° C., 10 bar, and $H_2$/CO=2.
Figure 10:
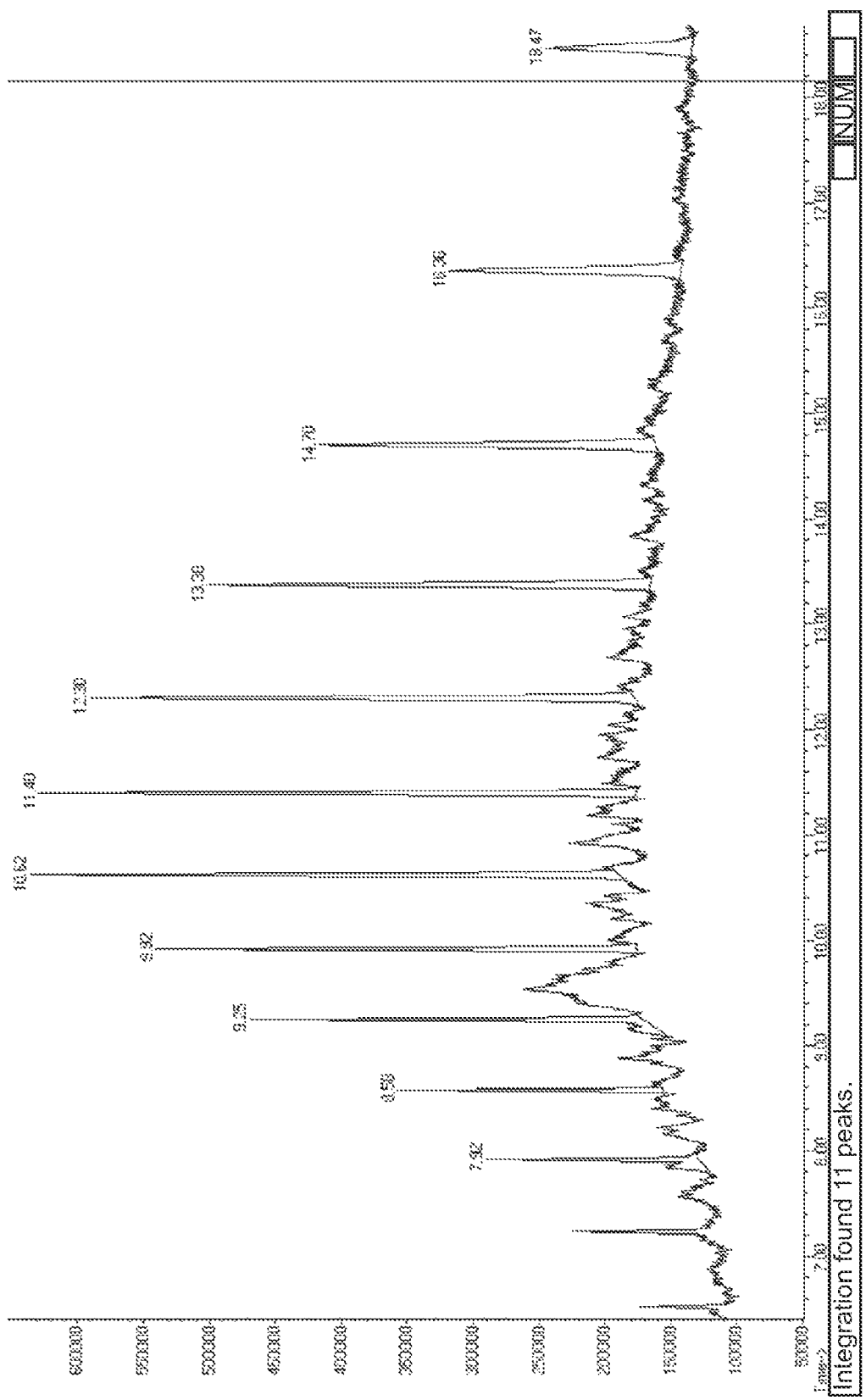
FIG. 10 is a GC-MS analysis of hydrocarbon products produced with a Co/BEA catalyst at 230° C., 10 bar, and $H_2$/CO=2.

FIGS. 1-10 demonstrate suppression of alcohol formation by the acidic support-based catalysts formed according to the presently disclosed method. FIGS. 3-6 show GC-MS analyses of hydrocarbon products produced with a Co/alumina catalyst as comparatives. As shown in FIGS. 3-6, the Co/alumina catalyst, in contrast to the presently disclosed catalyst, produces n-paraffins and n-alcohols. As shown in FIGS. 1-2, a Co/ZSM-5 catalyst produces n-paraffins and some olefins, but no alcohols. As shown in FIGS. 7-8, a Co/USY (CBV-780) catalyst and a Co/USY-3 catalyst, respectively, provide a carbon number distribution similar to that produced with the comparative Co/alumina. While the Co/USY and Co/USY-3 catalysts produce some olefins, they do not produce alcohols. As shown in FIGS. 9-10, a Co/beta (BEA) catalyst produces few olefins and no alcohols.

Accordingly, the acidic support-based catalysts produced by the presently disclosed method can reduce or completely or substantially eliminate (i.e. within the limits of detection) alcohols from Fischer-Tropsch products. In one embodiment, Fischer-Tropsch products produced with the acidic support-based catalysts comprise between 0.00 wt % and about 0.02 wt % alcohols. Alcohol levels referred to herein can be measured by GC-MS. This reduction or elimination of alcohols can advantageously simplify a Gas-to-Liquids (GTL) process incorporating a Fischer-Tropsch reaction, in particular, by simplifying Fischer-Tropsch product processing prior to hydrocracking Alcohols are detrimental to hydrocracking catalysts because hydrocracking catalysts rapidly dehydrate alcohols to olefins and water, which can poison hydrocracking catalysts. Typically, oxygenates (e.g. alcohols and acids) in Fischer-Tropsch products are converted to water and the resulting water is scrubbed prior to hydrocracking the Fischer-Trospch products. Thus, reduction or elimination of alcohols can reduce oxygenate conversion and water scrubbing prior to hydrocracking The acidic support may be pre-calcined. For example, precalcination of the acidic support at a temperature of about 700-800° C., for example, about 750° C., may be desirable.

Typically, as discussed above, turbulent mixing utilizes a gaseous transport stream such as air or nitrogen. An exemplary turbulent mixing device is manufactured by Ehrfeld Mikrotechnik BTS GmbH of Wendelsheim, Germany. In such a mixer, mixing takes place in a small volume, using air to create turbulence.

The mixer used for turbulent mixing can be equipped with micronozzles made from sapphire. Standard diameters of the nozzle openings are, for example, 50 and 100 µm, respectively. The body of the module can be made from Hastelloy.

Flow rates of the acidic solution, the basic solution, and the gaseous transport stream are sufficient to achieve turbulent mixing and will depend on the size of the mixing zone. For example, flow rates of the acidic solution and the basic solution can be set to precipitate 200-250 mL of solution in about 15 minutes (e.g., on the order of 10 mL/min each). Flow rates can increase by several times in a larger continuous flow apparatus.

In one embodiment, depositing the cobalt oxy-hydroxycarbonate species onto the acidic support may involve injecting the cobalt oxy-hydroxycarbonate species into an aqueous slurry of the acidic support. The aqueous slurry of the acidic support may be well-stirred and hot. The aqueous slurry of the acidic support can be heated to a temperature of about 80-100° C., for example, about 90° C. Formation of the aqueous slurry of the acidic support, before precipitation, can increase the activity of the resulting catalyst.

In another embodiment, depositing the cobalt oxy-hydroxycarbonate species onto the acidic support may involve mixing the acidic support with the basic solution such that the cobalt oxy-hydroxycarbonate species precipitates (e.g., continuously precipitates) onto the acidic support. Adding the acidic support to, for example, a basic solution of ammonium carbonate, titrates the acid sites with ammonium ions. The ammonium ions can later burn off in air to re-create proton sites. In particular, adding about 20-50 micron-sized zeolite powder to ammonium carbonate solution heated to about 80-100° C. can provide a Fischer-Tropsch catalyst (e.g. Co/ZSM-5) with very high activity.

The method may involve a single precipitation/deposition or multiple precipitation/deposition iterations with intervening decompositions. In an embodiment of the method involving a single precipitation/deposition, the catalyst may have a metal loading of $\leq 14$ wt % Co, for example, $\leq 9$ wt % Co to preserve sufficient specific activity. In an embodiment of the method involving multiple precipitation/deposition iterations, the intervening decompositions can advantageously open up pore volume, thereby permitting higher metal loadings while maintaining sufficient specific activity.

In one embodiment, the weight ratio of the acidic support material to cobalt is at least about 10:1. This weight ratio can provide the above-described shift to liquid hydrocarbon products that produces a significant amount of liquid hydrocarbon products. For example, for a pure zeolite, this weight ratio limits Co loading to about 9 wt %. For a bound zeolite, this weight ratio limits Co loading to a value that is proportionally less than about 9 wt % depending on the zeolite concentration (e.g. about 7 wt % Co loading for about 80 wt % zeolite concentration).

Following turbulent mixing, the resulting solution and precipitate can then be quickly conveyed to a larger volume containing slurried support, where precipitate and support are aged together (e.g., for 1 hour, at a temperature of about 80° C.). During aging, the precipitate re-dissolves and re-precipitates onto the support. Aging generally increases the activity of the resulting catalyst by loading and dispersing cobalt onto the support so that it is highly accessible to both $H_2$ and CO.

Aging in a large volume is beneficial on a commercial scale. Continuous aging in a large volume is also beneficial. With continuous aging, the aging volume can be advantageously large relative to the flow in and flow out, so that the flow out does not contain a significant amount of unreacted support and unreacted precipitate. In one embodiment, the aging volume is equal to or greater than the volume required to provide a residence time of an hour (i.e. equal to or greater than 60× the rate entering/exiting the aging volume in mL/min). A process configuration having smaller turbulent mixing zones in parallel with the mixing zones' product directed into a large aging volume may be preferable.

The process may be a batch process, a continuous process, or a combination thereof. For example, precipitation, deposition, and aging may be continuous. If aging is continuous, the resulting solution and precipitate and a fresh feed of slurried support can enter the aging zone at a rate equal to aged slurry exiting the aging zone. Thereafter, the temperature of the aged slurry can be dropped to stop aging. The aged slurry can then be filtered batch-wise.

The acidic solution comprising cobalt may further comprise one or more of Re, Ru, Pt, Pd, Ir, Rh, Os, Au, Ag, Cu, and Mn. Thus, the catalyst forming method may deposit metal species in addition to the cobalt oxy-hydroxycarbonate species onto the acidic support. In particular, the Fischer-Tropsch catalysts formed by the presently disclosed method can contain an effective amount of cobalt and one or more of Re, Ru, Pt, Pd, Ir, Rh, Os, Au, Ag, Cu, and Mn on the acidic support. These promoters can assist in Co reduction. These metals are more easily reduced than Co and promote Co reduction by spillover hydrogen. The amount of cobalt present in the catalyst can be between about 1 and about 25 weight percent of the total catalyst composition.

The acidic solution may comprise cobalt (II) nitrate. The acidic solution may further comprise $RuCl_3$ or the nitrosyl nitrate salt of Ru. For example, the acidic solution may comprise $Co(NO_3)_2*6H_2O+Ru(NO)(NO_3)_3$, with a weight ratio of Co:Ru of between about 20:1 and about 400:1 (e.g. about 40:1), or $Co(NO_3)_2*6H_2O+La(NO_3)_3*6H_2O+Ru(NO)(NO_3)_3$, with a weight ratio of Co/Ru/La=about 40/1/1. Accordingly, a ruthenium-hydroxy species, as well as a lanthanum species, may be precipitated with the cobalt oxy-hydroxycarbonate species.

The basic solution may comprise $(NH_4)_2CO_3$. The pH of the basic solution can be between about 7 and about 8. Setting the flow rates with a slight excess of the basic solution can provide these pH values.

One embodiment involves heating the acidic solution and the basic solution. The acidic and basic solutions can be heated to a temperature of about 70-100° C., for example, about 80° C. In an embodiment, the acidic solution can be heated to near boiling.

II. Drying

The catalyst comprising cobalt and the acidic support can be dried, for example, by freeze-drying (i.e., freezing in liquid nitrogen) followed by spray drying. A spray-freeze/freeze-dry process is described in Example 1 herein. The catalyst can also be oven dried (e.g., in an oven at 120° C. for 15 hours). The catalyst comprising cobalt and the acidic support may also be spray dried, for example, to provide a fluidized bed catalyst or a slurry catalyst. Alternatively, the catalyst comprising cobalt and the acidic support may be formed and shaped to produce a fixed-bed catalyst.

III. Conditioning/Activation procedures a. Generally

Conditioning/activation serves to provide metals in their zero-valent form, increases the metal loading and/or increases the metal dispersion on the support material. Metals are present in cationic form when precipitated onto the support material. However, metals in cationic form are inactive for Fischer-Trospch synthesis. An effective Fischer-Tropsch catalyst requires metals in their zero-valent (i.e. metallic) form. An effective Fischer-Tropsch catalyst also requires a high metal loading and/or a high metal dispersion to provide a highly accessible metal surface area to both $H_2$ and CO. Metal dispersion decreases with increased metal loading so a balance is necessary.

Aging as discussed above serves to condition/activate the catalyst. Additional conditioning/activation steps are discussed below.

b. Decomposition

The catalyst comprising cobalt and the acidic support may also be subjected to decomposition to decompose the cobalt oxy-hydroxycarbonate species. Decomposition refers to the separation of a chemical compound and is known in the art. In the method described herein, the cobalt oxy-hydroxycarbonate species decomposes into cobalt oxyhydroxides. It has been discovered that decomposition by heating to about 200-250° C. in an oxidizing environment, inert gas or a reducing environment, before further calcination, can advantageously increase activity. Decomposition is best accomplished in a fluid or moving bed because a large amount of $CO_2$ may be released.

c. Calcination

The catalyst comprising cobalt and the acidic support may be calcined. Calcination is known in the art. Calcination converts metal salts to their (dry) oxide form thereby decreasing water content for subsequent reduction. Water is undesirable during reduction because water raises the reduction temperature increasing the chances of undesirably sintering the metallic crystallites. It has been discovered that calcination at an intermediate temperature (e.g. about 300-400° C., for example, about 300° C.) can advantageously increase activity. For example, calcining the catalyst comprising cobalt and the acidic support can be performed in a fluidized (i.e., moving) bed at a temperature of about 300-400° C., for example, about 300° C., for about 2-16 hours, for example, about 8 hours.

d. Reduction

The catalyst comprising cobalt and the acidic support may be reduced. Reduction is known in the art. Reduction converts the cobalt oxyhydroxides into cobalt crystallites in zero-valent form to provide an effective Fischer-Tropsch catalyst. The catalyst should be reduced slowly enough to avoid sintering the metallic crystallites. For example, the catalyst can be heated at a rate of $\leq 1°$ C./min while maintaining vapor pressure below about 1% atmospheric pressure. The catalyst comprising cobalt and the acidic support can be reduced in a fast flow of hydrogen at a temperature of about 300-400° C., for example, about 350° C., for about 8-16 hours, for example, about 12 hours. In one embodiment, the catalyst is reduced at a temperature of about 400° C. to achieve slightly better activity.

e. Reoxidation

After reduction, the catalyst comprising cobalt and the acidic support may be reoxidized. Oxidation is known in the art. Upon reoxidation, the cobalt is in an oxide state different from the oxide state after calcination. After reoxidation, the catalyst can be reduced at temperatures about 100-150° C. lower than those required for the initial reduction. Re-oxidation may occur at a temperature of about 200-300° C., for example, about 300° C., in air. Reoxidation and subsequent reduction are desirable, but not necessary, because the catalyst is active after the initial reduction. If reoxidation occurs, it should not occur at higher than about 300° C. because temperatures higher than about 300° C. can cause a significant decrease in activity.

f. Second Reduction

If the catalyst is reoxidized, a second reduction converts the cobalt oxyhydroxides into cobalt crystallites in zero-valent form to provide an effective Fischer-Tropsch catalyst. For example, the catalyst can be reduced from about 200° C. to about 350° C., for example, from about 200° C. to about 260° C. This lower temperature range can be advantageous in a large reactor system. The general sequence of reduction, reoxidation, and a second reduction (i.e ROR) is known in the art. For example, the general sequence of reduction, reoxidation, and a second reduction is disclosed in U.S. Pat. Nos. 4,605,676 and 4,729,981, which patents are incorporated herein by reference in their entirety.

g. Passivation

The catalyst comprising cobalt and the acidic support may be passivated between reduction and re-oxidation and/or after the second reduction. In particular, passivation after a second reduction is useful if the catalyst is activated in a reactor separate from the Fischer-Tropsch reactor. If the catalyst is activated in situ, passivation after a second reduction is not required and synthesis gas may be introduced to the Fischer-Tropsch reactor directly after the second reduction. Passivation is known in the art. In the present method, passivation typically covers the Co atoms on the metal surfaces with 1-2 atoms of O. At this point in the method, cobalt is well-dispersed on the support material (e.g. the support material comprises 20 wt % Co) and is extremely pyrophoric. Accordingly, it has been discovered that passivation in dilute air or with a limited air flow is advantageous. For example, passivation can comprise first purging with inert gas at reduction temperature, then cooling to ambient temperature (e.g., <50° C.), then passing nitrogen-diluted air (e.g., 1% $O_2$) over the catalyst.

C. Method of Performing a Fischer-Tropsch Synthesis Reaction

The method of performing a Fischer-Tropsch synthesis reaction comprises forming a cobalt-containing Fischer- Tropsch catalyst according to the method described herein and contacting the cobalt-containing Fischer-Tropsch catalyst with synthesis gas to provide Fischer-Tropsch products. In one embodiment, the Fischer-Tropsch products formed by this method comprise very little or no alcohols, for example, between 0.00 wt % and about 0.02 wt % alcohols.

The cobalt-containing Fischer-Tropsch catalyst formed by the presently disclosed methods can be used to make heavy gasoline- and diesel-range hydrocarbons with a high degree of branching. The Fischer-Tropsch catalyst converts synthesis gas to linear hydrocarbons corresponding to a Schulz-Flory distribution. The acidic support oligomerises and isomerises the Fischer-Tropsch chain carrier alpha-olefins to internal or branched hydrocarbons. Because the internal and branched olefins are not readily re-adsorbed, the overall chain-growth decreases for $C_4+$ species. The acidic support-based Fischer-Tropsch catalyst can exhibit the following: high Fischer-Tropsch-synthesis activity and chain-growth probability through $C_3$; high activity for $C_2$, $C_3$, $C_4$ oligomerisation and hydrocarbon isomerisation at Fischer-Tropsch synthesis conditions; little to no deactivation of the Fischer-Tropsch synthesis and acid functionalities in a hydrothermal, reducing atmosphere; and high intimacy between the Fischer-Tropsch synthesis and acid functionalities to minimize mass transport limitations.

The Fischer-Tropsch synthesis process converts a variety of hydrocarbonaceous resources (e.g. biomass, natural gas, coal, shale oil, petroleum, refinery fuel gas, tar sands, oil shale, municipal waste, agricultural waste, forestry waste, wood, shale oil, bitumen, crude oil, fractions from crude oil, and combinations thereof) into hydrocarbon products typically obtained from petroleum. To prepare hydrocarbons via the Fischer-Tropsch process, one of these feedstocks is first converted into synthesis gas. The synthesis gas is further processed into syncrude by the Fischer-Tropsch process. Syncrude prepared from the Fischer-Tropsch process comprises a mixture of various solid, liquid, and gaseous hydrocarbons.

In Fischer-Tropsch chemistry, syngas is converted to liquid hydrocarbons by contact with a Fischer-Tropsch catalyst under reactive conditions. Typically, methane and optionally heavier hydrocarbons (i.e. ethane and heavier) are sent through a conventional syngas generator to provide synthesis gas. Generally, synthesis gas contains hydrogen and carbon monoxide, and may include minor amounts of carbon dioxide and/or water. The presence of sulfur, nitrogen, halogen, selenium, phosphorus and arsenic contaminants in the syngas is undesirable. For this reason and depending on the quality of the syngas, sulfur and other contaminants may be removed from the feed before performing the Fischer-Tropsch chemistry. Means for removing these contaminants are well known to those of skill in the art. For example, ZnO guard beds may be used to remove sulfur impurities. It also may be desirable to purify the syngas prior to the Fischer-Tropsch reactor to remove carbon dioxide produced during the syngas reaction and any additional sulfur compounds not already removed. This can be accomplished, for example, by contacting the syngas with a mildly alkaline solution (e.g., aqueous potassium carbonate) in a packed column.

In the Fischer-Tropsch process, contacting a synthesis gas comprising a mixture of $H_2$ and CO with a Fischer-Tropsch catalyst under suitable temperature and pressure reactive conditions forms liquid, gaseous, and solid hydrocarbons. The Fischer-Tropsch reaction over cobalt is typically conducted at temperatures of about 165° C. to about 250° C., optionally about 205° C. to about 240° C.; pressures of about 10-600 psia (0.7-41 bar), optionally about 75-350 psia (5-25 bar); and catalyst space velocities of about 100-10,000 cc/g/hr, optionally about 300-3,000 cc/g/hr. Conditions for performing Fischer-Tropsch type reactions are well known to those of skill in the art.

The products of the Fischer-Tropsch synthesis process may range from $C_1$ to $C_{200+}$ with a majority in the $C_5$ to $C_{100+}$ range. The reaction can be conducted in a variety of reactor types, such as fixed bed reactors containing one or more catalyst beds, slurry reactors, fluidized bed reactors, or a combination of different type reactors. Such reaction processes and reactors are well known and documented in the literature. In one embodiment, the synthesis gas contacts the cobalt-containing Fischer-Tropsch catalyst in a fluidized bed reactor or a fixed bed reactor.

The slurry Fischer-Tropsch process utilizes superior heat and mass transfer characteristics for the strongly exothermic synthesis reaction and is able to produce relatively high molecular weight, paraffinic hydrocarbons when using a cobalt catalyst. In the slurry process, a syngas comprising a mixture of hydrogen and carbon monoxide is bubbled up as a third phase through a slurry which comprises a particulate Fischer-Tropsch type hydrocarbon synthesis catalyst dispersed and suspended in a slurry liquid comprising hydrocarbon products of the synthesis reaction which are liquid under the reaction conditions. The mole ratio of the hydrogen to the carbon monoxide may broadly range from about 0.5 to about 4, but is more typically within the range of from about 0.7 to about 2.75 and optionally from about 0.7 to about 2.5. An example of a useful Fischer-Tropsch process is taught in EP 0609079, which is completely incorporated herein by reference for all purposes.

Fischer-Tropsch catalysts can provide chain growth probabilities that are relatively low to moderate, with the reaction products including a relatively high proportion of low molecular weight $C_{2-8}$ olefins and a relatively low proportion of high molecular weight $C_{30+}$ waxes, or relatively high chain growth probabilities, with the reaction products including a relatively low proportion of low molecular weight $C_{2-8}$ olefins and a relatively high proportion of high molecular weight $C_{30+}$ waxes.

Except for the light, mainly gaseous fraction, the product from a Fischer-Tropsch process contains predominantly paraffins. The products from Fischer-Tropsch reactions generally include a light reaction product and a waxy reaction product. The light reaction product (i.e., the condensate fraction) includes hydrocarbons boiling below about 371° C. (e.g., tail gases through middle distillate fuels), largely in the $C_5$-$C_{20}$ range, with decreasing amounts up to about $C_{30}$. The waxy reaction product (i.e., the wax fraction) includes hydrocarbons boiling above about 316° C. (e.g., vacuum gas oil through heavy paraffins), largely in the $C_{20+}$ range, with decreasing amounts down to $C_{10}$.

Both the light reaction product and the waxy product are substantially paraffinic. The waxy product generally comprises greater than 70 weight % normal paraffins, and often greater than 80 weight % normal paraffins.

The following examples are provided to further illustrate the present methods and advantages thereof. The examples are meant to be only illustrative, and not limiting.

EXAMPLES

Comparative Example 1

Synthesis of Comparative Catalyst 1

Precipitation and Deposition

A cobalt-ruthenium-lanthana Fischer-Tropsch catalyst was made by precipitating the three components from acidic nitrate solution onto a gamma-alumina support (ALCOA HiQ-7000 series, 30-70 μm) using a basic solution of ammonium carbonate. The support was calcined at 750° C. in air for three hours immediately prior to use. It was then slurried in distilled water and heated to ≧80° C. in an open receiving vessel that was large enough to accommodate influx of the reactant solutions. The slurry was stirred vigorously through the precipitation itself and also during subsequent aging. The nitrate solution contained cobalt, ruthenium and lanthanum in approximately a 40:1:1 weight ratio and was also kept at 80° C. or hotter. Cobalt and lanthanum were added as the hydrated nitrate salt, while ruthenium nitrosyl nitrate was the ruthenium source. Representative quantities were as follows.

Nitrate solution: 133 mg $RuCl_3$ (or an equivalent amount of the nitrosyl nitrate salt), 338 mg $La(NO_3)_3 \cdot 6H_2O$, and 15.272 g of $Co(NO_3)_2 \cdot 6H_2O$ were dissolved in 130 mL distilled water.

Carbonate solution: 5.95 g $(NH_4)_2CO_3$ was dissolved in another 130 mL to make a 0.48M solution.

Alumina support: 10 g of precalcined alumina was suspended in 50 ml distilled water.

The ammonium carbonate solution and the metal nitrate solution, both at ≧80° C., were fed at flow rates of about 40 mL/min via peristaltic pumps to two of the inlets of a turbulent mixing volume about 1 mm in diameter. The mixing zone had three inlets and one outlet. A flow of about 6 mL (STP)/min nitrogen was fed to the other inlet to keep the mixing volume well agitated. The nitrogen inlet pressure was about 0.5 atm above ambient pressure. Relative concentrations and/or flow rates of the basic and acidic solutions were adjusted to maintain a pH=7-8 in the turbulent zone. This was more precise than trying to control the pH through feedback from the pH measurement itself. The slurry of fresh precipitate passed immediately through the mixing volume outlet and directly into the suspension containing the support. It was delivered there within a second of being formed.

Enough precipitate slurry was passed into the support suspension to reach the target concentration levels on the catalyst. The amount of catalyst components added per 10 g of alumina were 2.31 g Co metal, 0.065 Ru metal, and 0.125 g lanthanum oxide. The finished catalyst compositions were then 18 wt % Co, 0.5 wt % Ru, 1 wt % $La_2O_3$, and 80.5 wt % alumina. The catalysts were made with a single precipitation step, but specific catalyst activities declined slightly above 9 wt % Co and rapidly above 14 wt % Co for catalysts made this way. Higher specific activities for the high metal loadings would require multiple precipitations, each contributing a fraction of the target loading, with intervening decompositions of the metal oxy-hydroxycarbonate species in order to open up pore volume.

After the reactant solution flows were stopped, the catalyst suspension was aged for ten minutes to an hour at 80° C. or above, with constant stirring. The catalyst solids were then filtered from the suspension and washed thoroughly. This batch process could be converted into a continuous one by addition of large volume reservoirs for the reactant solutions and two or more holding tanks in series for aging the precipitated catalyst.

Treatments

Spray-Freeze/Freeze Dry

The damp catalyst solids were reslurried in distilled water and sprayed into liquid nitrogen via an injector similar to those used in automobiles to inject fuels into the cylinders. Pulses of the slurry were sprayed at timed intervals that allowed the liquid nitrogen to almost quit boiling after each injection. Depending on the solids content in the slurry, sizes of the mainly spherical, frozen catalyst could be varied from about one millimeter in diameter to several millimeters. The frozen particles were then transferred to a freeze-dry apparatus where they were dried under vacuum while still frozen. This procedure produced uniform, porous catalyst particles using very small quantities of material; it is referred to herein as the "spray-freeze/freeze dry" (SFFD) process. The SFFD process is described in EP 1450950, the contents of which are incorporated herein in their entirety. For larger scales, a conventional spray drying process would produce large quantities of 100 μm-sized particles.

Conditioning/Activation

Decomposition: The SFFD-formed catalyst was then heated in a gently moving bed (a modified rotary evaporator) under a flow of air to 200° C. This decomposed the metal oxy-hydroxycarbonate species to metal oxyhydroxides.

Catalyst samples containing 30 mg cobalt were sized to 125-160 μm and diluted with corundum particles having similar sizes. The alumina-supported catalyst was diluted to 25% of the total weight. The catalysts were loaded into one of sixteen 3.6 mm ID reactors in a multireactor test unit. They were conditioned and activated at 2 atm pressure, which was the pressure required to reliably obtain all the required treatment flows against a vent pressure of 1 atm.

In Example 1, the catalyst was subjected to the further conditioning/activation treatment described below. Comparative Catalyst 1 refers to the catalyst formed by the process of Example 1.

Drying and Calcination: First, the samples were heated at 1° C./min to 120° C. in dry air at a flow of 15.6 sccm (GHSV (i.e. gaseous hourly space velocity) per catalyst about 1000 $h^{-1}$, total GHSV about 250 $h^{-1}$) and held at that temperature for 3 hours, then were heated again in the same air flow at 1° C./min up to 300° C. and held at that temperature for 9 hours. The heating was then stopped and the samples were allowed to cool ballistically. The temperature decreased to 200° C. in about one-half hour and 100° C. in about three hours. When it reached 50° C., the air flow was replaced by an equal flow of nitrogen to purge the catalysts and lines of oxygen.

Reduction and Passivation: The samples were next switched to a 25 sccm flow of hydrogen after the nitrogen purge had continued for about one-half hour (GHSV per catalyst about 1500 $h^{-1}$, total GHSV about 375 $h^{-1}$). The catalysts were then heated at 1° C./min to 400° C. in the hydrogen flow and held at that temperature for 15 hours. They were then cooled linearly at about 0.4° C./min to a little above 50° C., where cooling became limited to even slower rates. At that point, the hydrogen was replaced by a nitrogen flow of 8.3 sccm (GHSV per catalyst about 500 $h^{-1}$, total GHSV about 125 $h^{-1}$). The catalyst was held in the nitrogen flow for about 3 hours and cooleld to about 40° C. The nitrogen flow was slowly replaced by a similar air flow and the catalyst was held in the air flow for 10 hours. If diluted air (ca 2% $O_2$) is used, the passivation step can start at a higher temperature (about 100° C.).

Reoxidation: The reduced and passivated samples were then heated in air at 1° C./min to 300° C., held at that temperature for 7 hours, and then cooled ballistically as in the initial calcination. The same air flow was also used (15.6 sccm=GHSV per catalyst about 1000 h$^{-1}$, total GHSV about 250 h$^{-1}$). This temperature is about the highest that can reliably be used before some solid state reaction of cobalt oxides with alumina or silica occurs.

Second Reduction and Passivation: The samples were again reduced with a temperature-time profile, gas flows, and switching times identical to that for the first reduction except that the maximum temperature was 350° C. Ruthenium and cobalt are alloyed at this point and are present in oxide particles that interact much less with the alumina support than the initial monolayer, so the catalysts are much easier to reduce. A maximum temperature of 250° C. is sufficient, and a lower hydrogen concentration (5-10% hydrogen in nitrogen) may be used. For these samples, final reductions were at 1° C./min to 350° C. with a ten hour hold.

Example 2

Synthesis of Catalyst 2

A catalyst was prepared as in Comparative Example 1 with the following exceptions. Beta zeolite CP811C-300 from Zeolyst International was used instead of the alumina support. This zeolite had a Si/Al mole ratio of 150. The zeolite-supported catalyst was diluted to 50% of the total weight once. The metal loading was half as large and no La was added. The finished catalyst contained 9 wt % Co and 0.25 wt % Ru so that the zeolite to metal weight ratio was about 10. After SFFD, the catalyst was heated to 220° C. in air in a rotating flask to decompose the metal oxy-hydroxycarbonate species. Thereafter, the catalyst was transferred to an activation unit and subjected to the further conditioning/activation treatments described in Example 1. Catalyst 2 refers to the catalyst formed by the process of Example 2.

Example 3

Synthesis of Catalyst 3

A catalyst was prepared as in Example 2 with the following exceptions. Beta zeolite CP811E-150 from Zeolyst International was used instead of the zeolite described in Example 2. The zeolite had a Si/Al mole ratio of 75. Catalyst 3 refers to the catalyst formed by the process of Example 3.

Example 4

Synthesis of Catalyst 4

A catalyst was prepared as in Example 2 with the following exceptions. Beta zeolite CP814E from Zeolyst International was used instead of the zeolite described in Example 2. The zeolite had a Si/Al mole ratio of 12.5. Catalyst 4 refers to the catalyst formed by the process of Example 4.

Example 5

Synthesis of Catalyst 5

A catalyst was prepared as in Example 2 with the following exceptions. Beta zeolite CP814N from Zeolyst International was used instead of the zeolite described in Example 2. The zeolite had a Si/Al mole ratio of 9. Catalyst 5 refers to the catalyst formed by the process of Example 5.

Example 6

Synthesis of Catalyst 6

A catalyst was prepared as in Example 2 with the following exceptions. USY zeolite CBV 780 from Zeolyst International was used instead of the zeolite described in Example 2. The zeolite had a Si/Al mole ratio of 40. After SFFD and decomposition, the catalyst was transferred to a fixed bed reactor and subjected to the further conditioning/activation treatments described in Example 1. Catalyst 6 refers to the catalyst formed by the process of Example 6.

Example 7

Synthesis of Catalyst 7

Four catalysts were prepared as in Example 6 with the following exceptions. The following USY zeolites from Zeolyst International were used instead of the zeolite described in Example 6: CBV-720, CBV-712, CP300-56, and CP300-56D. The zeolites had Si/Al mole ratios of 11, 6, 6, and 4, respectively. Catalyst 7 refers to the catalysts formed by the process of Example 7. Accordingly, the results for Catalyst 7 are the average of the results for all four catalysts.

Example 8

Synthesis of Catalyst 8

Two catalysts were prepared as in Example 6 with the following exceptions. The following USY zeolites from Tosoh were used instead of the zeolite described in Example 6 HSC 330 and HSC 331. Both zeolites had a Si/Al mole ratio of 3.3. Catalyst 8 refers to the catalysts formed by the process of Example 8. Accordingly, the results for Catalyst 8 are the average of the results for both catalysts.

Example 9

Synthesis of Catalyst 9

A catalyst was prepared as in Example 6 with the following exceptions. USY zeolite CBV 500 from Zeolyst International was used instead of the zeolite described in Example 6. The zeolite had a Si/Al mole ratio of 2.8. Catalyst 9 refers to the catalyst formed by the process of Example 9.

Example 10

Synthesis of Catalyst 10

Seven catalysts were prepared as in Example 6 with the following exceptions. ZSM-5 zeolite CBV 8014 from Zeolyst International was used instead of the zeolite described in Example 6. The zeolite had a Si/Al mole ratio of 40. The catalysts also differed in their drying, calcining, and reduction treatments. Some were spray dried instead of freeze dried. Some were initially reduced at 350° C. instead of 400° C. Some were reduced only once and were not subjected to reoxidation and a second reduction. These changes in activation treatment caused a variation of about ±30% relative to the mean activity. Catalyst 10 refers to the catalyst formed by the process of Example 10. Accordingly, the results for Catalyst 10 are the average of the results for all seven catalysts.

Example 11

Synthesis of Catalyst 11

A catalyst was prepared as in Example 6 with the following exceptions. ZSM-12 zeolite prepared at Chevron was used instead of the zeolite described in Example 6. The zeolite had a Si/Al mole ratio of 45. Catalyst 11 refers to the catalyst formed by the process of Example 11.

Example 12

Synthesis Gas Conversion with Comparative Catalyst 1 and Catalysts 2-11

Comparative Catalyst 1 and Catalysts 2-11 were tested for synthesis gas conversion as follows. The synthesis gas conversion tests were carried out in the same reactors used for conditioning and activation. Test results were averaged for the multiple catalysts produced in Examples 7, 8, and 10, respectively, to provide results for Catalyst 7, Catalyst 8, and Catalyst 10, respectively. The temperature was reduced to 190° C. and the pressure of hydrogen was increased to 10 atm. A flow of 1-2 L/h per reactor of synthesis gas with a $H_2/CO$ mole ratio of 2 was initiated. After a 100 hour breaking in period, the temperature was increased in 10° C. stages to a maximum of 240° C., which was the limit for effective temperature control without further dilution of the catalysts. Pressure and $H_2/CO$ ratio, respectively, were also varied in some experiments from 10 to 20 atm and from 1.6 to 2.0, respectively. $H_2$, CO, $CO_2$, and hydrocarbon products up to $C_{13}H_{28}$ were analyzed online by gas chromatography. Hot traps at 150° C. collected $C_{13}+$ hydrocarbons. These were drained periodically and the $C_{13}+$ hydrocarbons were weighed and analyzed offline, also by gas chromatography. Run periods were 50-100 hours at each condition to allow equilibration and collection of representative samples.

As shown in Table 1, the average specific activities (in weight of hydrocarbon product per weight of cobalt per hour) and average volumetric activities (in weight of hydrocarbon product per catalyst volume per hour) were comparable for Comparative Catalyst 1 and Catalysts 2-11. However, with beta zeolite-supported Catalysts 2-5 and USY zeolite-supported Catalysts 6-9, the average specific activities increased as the Si/Al ratio increased. In particular, the average specific activities increased by factors of 2.5-3 from the most acidic zeolite to the least acidic zeolite. For the beta zeolite-supported Catalysts 2-5, the average specific activity varied from 2.1 $g_{carbon}/g_{Co}/h$ at Si/Al=9 to 5.6 $g_{carbon}/g_{Co}/h$ at Si/Al=150. For the USY zeolite-supported Catalysts 6-9, the average specific activity varied from 1.7 $g_{carbon}/g_{Co}/h$ at Si/Al=2.8 to 4.9 $g_{carbon}/g_{Co}/h$ at Si/Al=40. This change may reflect interaction of cobalt with the acid sites of the zeolites with low Si/Al ratios such that much of the cobalt is not reducible during activation treatment.

TABLE 1

Activities of Comparative Catalyst 1 and Catalysts 2-11
230° C., 10 atm, $H_2/CO$ = 2, GHSV = 1000-1500 mL/mL$_{catalyst}$/h, Time on stream >200 hours

| Support | Source | Si/Al | Treatment | Co | Hydrocarbon Rate gC/g$_{Co}$/h | gC/mL/h |
|---|---|---|---|---|---|---|
| Alumina 1 | Chevron | 0 | FD-Ox200-R400-Ox300-R350 | 18% | 3.57 | 0.09 |
| BEA 2 | Zeolyst CP811C-300 | 150 | FD-Ox220-R400-Ox300-R350 | 9% | 5.56 | 0.10 |
| BEA 3 | Zeolyst CP811E-150 | 75 | FD-Ox220-R400-Ox300-R350 | 9% | 4.05 | 0.10 |
| BEA 4 | Zeolyst CP814E | 12.5 | FD-Ox220-R400-Ox300-R350 | 9% | 2.72 | 0.06 |
| BEA 5 | Zeolyst CP814N | 9 | FD-Ox220-R400-Ox300-R350 | 9% | 2.11 | 0.05 |
|  |  |  |  | Mean | 3.6 ± 1.5 | 0.08 ± 0.03 |
| USY 6 | Zeolyst CBV 780 | 40 | FD-Ox220-R400-Ox300-R350 | 9% | 4.90 | 0.12 |
| USY 7 | Zeolyst USY's (4)[†] | 4-11 | FD-Ox220-R400-Ox300-R350 | 9% | 3.16 | 0.07 |
| USY 8 | Tosoh HSC 330,331 | 3.3 | FD-Ox220-R400-Ox300-R350 | 9% | 2.54 | 0.06 |
| USY 9 | Zeolyst CBV 500 | 2.8 | FD-Ox220-R400-Ox300-R350 | 9% | 1.67 | 0.04 |
|  |  |  |  | Mean | 3.1 ± 1.4 | 0.07 ± 0.03 |
| (ZSM-5) 10 | Zeolyst CBV 8014 | 40 | Several (7)* | 9% | 3.2 ± 0.9 | 0.07 ± 0.02 |
| (ZSM-12) 11 | Chevron | 45 | FD-Ox220-R400-Ox300-R350 | 9% | 3.2 | 0.07 |

FD = spray freeze-freeze drying
Ox220 = air calcination at 220° C. in a rotating flask to decompose carbonate precursors
R400 = 1st reduction at 1° C./min. to 400° C. with >6 hour hold at 400° C.
Ox300 = reoxidation in air at 1° C./min. to 300° C., after passivation in diluted air at <50° C.
R350 = 2nd reduction at 1° C./min. to 350° C. with >2 hour hold at 350° C.
[†]CBV 720, CBV 712, CP300-56, CP300-56D
*The different procedures are described in Example 10.

The FD-Ox220-R400-Ox300-R350 treatment was superior with respect to specific activity per unit weight of metal. Spray drying produced denser catalyst particles and a higher volumetric activity.

Table 2 shows hydrocarbon selectivities for catalysts made with alumina, ZSM-5, and alumina bound ZSM-5 having 40-50 wt % ZSM-5. The ZSM-5 was CBV 8014 from Zeolyst International having a Si/Al mole ratio of 40.

The hydrocarbon synthesis rates for the comparative alumina catalyst, the ZSM-5 catalyst, and the alumina bound ZSM-5 catalyst were about equal. Increasing ZSM-5 content led to decreasing $C_{13}+$ and increasing $C_{1-4}$ selectivities. At or above a ZSM-5/Co weight ratio of about 10, no wax was formed even at higher pressure (20 atm). A similar shift occurred with increasing temperature or $H_2/CO$ ratio. While the comparative alumina-supported catalyst produced a large amount (i.e. 25% or more) of wax, the zeolite-supported catalyst shifted most of that wax into liquid hydrocarbons (i.e. $C_5$-$C_{20}$).

TABLE 2

Selectivities of CoRu/ZSM-5 Catalysts
10 atm, $H_2/CO$ = 1.6, GHSV = 1000-1500 $mL/mL_{catalyst}/h$,
Time on stream >200 hours

| Support | Temp. °C. | % Co | Z/Co | Hydrocarbon Selectivity, C % | | |
|---|---|---|---|---|---|---|
| | | | | $C_1$-$C_4$ | $C_5$-$C_{12}$ | $C_{13}+$ |
| Alumina | 230 | 1.6 | 18 | 0 | 10 | 32 | 58 |
| ZSM-5/alumina* | 230 | 1.6 | 9 | 4-5 | 15 | 34 | 51 |
| ZSM-5 (CBV 8014) | 230 | 1.6 | 9 | 10 | 37 | 54 | 9 |
| Alumina | 240 | 1.6 | 18 | 0 | 15 | 35 | 50 |
| ZSM-5/alumina* | 240 | 1.6 | 9 | 4-5 | 20 | 40 | 40 |

*Approximately 40% ZSM-5-50% alumina or 50% ZSM-5-40% alumina with 9 wt % Co and 0.25 wt % Ru For catalysts made with high silica zeolites, even at high zeolite/Co weight ratios, there was little change in the carbon number distribution compared to that for alumina-supported catalysts. Furthermore, the high silica (i.e. low acidity) zeolites suppressed alcohol formation. Without wishing to be bound by any particular theory, it is believed that the high silica zeolites dehydrate alcohols to their corresponding olefins.

While various embodiments have been described, it is to be understood that variations and modifications may be resorted to as will be apparent to those skilled in the art. Such variations and modifications are to be considered within the purview and scope of the claims appended hereto.

What is claimed is:

1. A method for forming a cobalt-containing Fischer-Tropsch catalyst, comprising:
   precipitating a cobalt oxy-hydroxycarbonate species by turbulent mixing, wherein a basic solution is collided with an acidic solution comprising cobalt; and
   depositing the cobalt oxy-hydroxycarbonate species onto an acidic support to provide a catalyst comprising cobalt and the acidic support, wherein the acidic support comprises a zeolite, a molecular sieve, or combinations thereof.

2. The method of claim 1, wherein depositing the cobalt oxy-hydroxycarbonate species onto the acidic support comprises injecting the cobalt oxy-hydroxycarbonate species into an aqueous slurry of the acidic support.

3. The method of claim 1, wherein depositing the cobalt oxy-hydroxycarbonate species onto the acidic support comprises mixing the acidic support with the basic solution such that the cobalt oxy-hydroxycarbonate species is precipitated onto the acidic support.

4. The method of claim 1, further comprising multiple precipitation/deposition iterations with intervening decompositions.

5. The method of claim 1, wherein the weight ratio of the zeolite, the molecular sieve, or combinations thereof to cobalt is at least about 10:1.

6. The method of claim 1, wherein the acidic solution and a basic solution are heated.

7. The method of claim 6, wherein the acidic solution and a basic solution are heated to a temperature of about 80° C.

8. The method of claim 1, wherein the acidic solution comprises cobalt (II) nitrate.

9. The method of claim 1, wherein the acidic solution further comprises one or more metals selected from the group consisting of Re, Ru, Pt, Pd, Ir, Rh, Os, Au, Ag, Cu, and Mn.

10. The method of claim 9, wherein the acidic solution comprises $Co(NO_3)_2 \cdot 6H_2O + Ru(NO)(NO_3)_3$.

11. The method of claim 10, wherein the acidic solution has a weight ratio of Co:Ru between about 20:1 and about 400:1.

12. The method of claim 1, wherein the basic solution comprises $(NH_4)_2CO_3$ and has a pH of about 7 to about 8.

13. The method of claim 1, further comprising decomposing the oxyhydroxycarbonate species from about 200° C. to about 250° C. in an oxidizing environment, inert gas or a reducing environment.

14. The method of claim 13, further comprising calcining the catalyst comprising cobalt and the acidic support at a temperature of about 300° C. to about 400° C.

15. The method of claim 1, further comprising reducing the catalyst comprising cobalt and the acidic support.

16. The method of claim 15, further comprising re-oxidizing the catalyst comprising cobalt and the acidic support at ≦ about 300° C.

17. The method of claim 16, further comprising reducing the catalyst comprising cobalt and the acidic support for a second time.

18. The method of claim 17, further comprising passivating the catalyst comprising cobalt and the acidic support between reducing and re-oxidizing and/or after reducing for a second time.

* * * * *